US008724487B1

(12) United States Patent
Aitken et al.

(10) Patent No.: US 8,724,487 B1
(45) Date of Patent: May 13, 2014

(54) SYSTEM AND METHOD FOR SYNCHRONIZED REPORTING IN A NETWORK ENVIRONMENT (75) Inventors: Paul J. Aitken, West Linton (GB); Aamer S. Akhter, Cary, NC (US); Paul Atkins, Edinburgh (GB); Benoit Claise, Othee (BE); Andrew G. Johnson, Edinburgh (GB)

(73) Assignee: Cisco Technology, Inc., San Jose, CA (US)

(*) Notice: Subject to any disclaimer, the term of this patent is extended or adjusted under 35 U.S.C. 154(b) by 534 days.

(21) Appl. No.: 12/705,654

(22) Filed: Feb. 15, 2010

(51) Int. Cl.
G06F 7/14 (2006.01)
H04L 7/08 (2006.01)

(52) U.S. Cl.
USPC ............ 370/252; 707/617; 707/620; 711/133

(58) Field of Classification Search
None
See application file for complete search history.

(56) References Cited

U.S. PATENT DOCUMENTS

| | | |
|---|---|---|
| 5,291,583 A | 3/1994 | Bapat |
| 5,737,518 A | 4/1998 | Worwood et al. |
| 5,864,865 A | 1/1999 | Lakis |
| 6,405,251 B1 | 6/2002 | Bullard et al. |
| 6,694,304 B1 | 2/2004 | Sethi |
| 6,704,780 B1 | 3/2004 | Sethi |
| 7,120,689 B2 | 10/2006 | Gonsalves et al. |
| 7,143,006 B2 | 11/2006 | Ma et al. |
| 7,385,924 B1 | 6/2008 | Riddle |
| 7,433,304 B1 | 10/2008 | Galloway et al. |
| 7,487,541 B2 | 2/2009 | Robert |
| 7,562,140 B2 | 7/2009 | Clemm et al. |
| 7,580,356 B1 | 8/2009 | Mishra et al. |
| 7,580,936 B2 | 8/2009 | Salgado |
| 7,606,895 B1 | 10/2009 | Dini et al. |
| 7,639,613 B1 | 12/2009 | Ghannadian et al. |
| 7,788,371 B2 | 8/2010 | Claise et al. |
| 8,499,068 B2 * | 7/2013 | Widera et al. ................. 709/224 |
| 2002/0078261 A1 | 6/2002 | Wiles et al. |

(Continued)

FOREIGN PATENT DOCUMENTS

| | | |
|---|---|---|
| CN | 102124698 A | 7/2011 |
| EP | 2255494 | 9/2010 |

(Continued)

OTHER PUBLICATIONS

Jul. 22, 2011 USPTO Final Office Action in U.S. Appl. No. 12/465,707.
PCT Sep. 6, 2011 International Preliminary Report on Patentability and Written Opinion from PCT/US2010/030607; 7 pages.
USPTO Non-Final Office Action mailed Mar. 9, 2011 for U.S. Appl. No. 12/465,707.

(Continued)

*Primary Examiner* — Hassan Phillips
*Assistant Examiner* — Duc Duong
(74) *Attorney, Agent, or Firm* — Patent Capital Group (57) ABSTRACT

A method is provided in one example embodiment and includes receiving a plurality of packets and generating a data record that is based on information associated with the packets. The data record includes a synchronized time window field that defines a time boundary at which data aggregation associated with the data record is stopped, where the synchronized time window field remains constant as the data aggregation associated with the data record occurs. In other embodiments, the method includes creating a new cache entry for new packets arriving at a network element, where the new cache entry is created in response to a value of the synchronized time window field changing. The synchronized time window field can include a window size attribute that defines how long the synchronized time window remains unchanged.

17 Claims, 5 Drawing Sheets

(56) References Cited

U.S. PATENT DOCUMENTS

| | | | |
|---|---|---|---|
| 2002/0091809 A1 | 7/2002 | Menzies et al. | |
| 2002/0133504 A1* | 9/2002 | Vlahos et al. | 707/104.1 |
| 2002/0133581 A1 | 9/2002 | Schwartz et al. | |
| 2003/0056193 A1 | 3/2003 | Perycz et al. | |
| 2003/0192047 A1 | 10/2003 | Gaul et al. | |
| 2003/0212767 A1 | 11/2003 | Yang-Huffman | |
| 2004/0054777 A1* | 3/2004 | Ackaouy et al. | 709/225 |
| 2004/0105394 A1 | 6/2004 | Martinot et al. | |
| 2004/0160464 A1 | 8/2004 | Reyna | |
| 2005/0021547 A1 | 1/2005 | Emaru et al. | |
| 2005/0039104 A1* | 2/2005 | Shah et al. | 714/776 |
| 2005/0060428 A1* | 3/2005 | Corl et al. | 709/240 |
| 2005/0278437 A1* | 12/2005 | Xie et al. | 709/223 |
| 2006/0230060 A1 | 10/2006 | Salgado | |
| 2006/0285501 A1 | 12/2006 | Damm | |
| 2007/0112955 A1 | 5/2007 | Clemm et al. | |
| 2007/0147246 A1 | 6/2007 | Hurley et al. | |
| 2007/0192448 A1 | 8/2007 | Sankaran | |
| 2007/0206490 A1 | 9/2007 | Altshuler et al. | |
| 2007/0217425 A1 | 9/2007 | Claise et al. | |
| 2007/0274213 A1 | 11/2007 | Stephan et al. | |
| 2008/0181217 A1 | 7/2008 | Sheppard et al. | |
| 2008/0250153 A1 | 10/2008 | Claise et al. | |
| 2008/0307080 A1 | 12/2008 | Stephan | |
| 2009/0046583 A1* | 2/2009 | Towster et al. | 370/232 |
| 2009/0141638 A1* | 6/2009 | Dolisy | 370/241 |
| 2010/0023699 A1* | 1/2010 | Reidel et al. | 711/134 |
| 2010/0034109 A1* | 2/2010 | Shomura et al. | 370/252 |
| 2010/0054151 A1 | 3/2010 | Droz et al. | |
| 2010/0070647 A1 | 3/2010 | Irino et al. | |
| 2010/0085891 A1 | 4/2010 | Kind et al. | |
| 2010/0188938 A1* | 7/2010 | Johnson et al. | 368/47 |
| 2010/0268808 A1* | 10/2010 | Chkodrov et al. | 709/223 |

FOREIGN PATENT DOCUMENTS

| | | |
|---|---|---|
| FR | 2005/034429 A1 | 4/2005 |
| WO | WO 2006/045918 A1 | 5/2006 |
| WO | WO 2010/102311 A1 | 9/2010 |

OTHER PUBLICATIONS

Jun. 9, 2011 Response to Non-Final Office Action from U.S. Appl. No. 12/465,707.

Claise, B, "Cisco Systems Netflow Services Export Version 9," IETF RFC 3954, 31 pages; Oct. 2004; http://www.ietf.org/rfc/rfc3954.txt.

Zseby, T., et al. "IP Flow Information Export (IPFIX) Applicability," IETF RFC 5472, 29 pages; Mar. 2009; http://www.ietf.org/rfc/rfc5472.txt.

Boschi, E., et al. Reducing Redundancy in IP Flow Information Export (IPFIX) and Packet Sampling (PSAMP) Reports, IETF RFC 5473, 26 pages; Mar. 2009; http://www.ietf.org/rfc/rfc5473.txt.

Stephan, E., IP Performance Metrics (IPPM) Metrics Registry, IETF RFC 4148, 14 pages; Aug. 2005; http://www.ietf.org/rfc/rfc4148.txt.

Hancock, R., Next Steps in Signaling (NSIS): Framework, IETF RFC 4080; 46 pages; Jun. 2005; http://www.ietf.org/rfc/rfc4080.txt.

Quittek, J., "Information Model for IP Flow Information Export," draft-ietf-ipfix-info-11, 131 pages; Sep. 22, 2005; http://www.ietf.org/proceedings/65/IDs/draft-ietf-ipfix-info-11.txt.

Claise, B., "IPFIX Protocol Specification," 64 pages; Sep. 2005; http://tools.ietf.org/pdf/draft-ietf-ipfix-protocol-19.pdf.

Claise, B., "IPFIX Protocol Specification," 64 pages; Mar. 2004; http://tools.ietf.org/pdf/draft-ietf-ipfix-protocol-09.pdf.

Editors: Norseth, K.C., et al. Architecture Model for IP Flow Information Export, 35 pages; Jun. 2002/Jun. 2004; http://tools.ietf.org/wg/ipfix/draft-ietf-ipfix-architecture/draft-ietf-ipfix-architecture-03-from-02.diff.txt.

Quittek, J., et al., "Requirements for IP Flow Information Export," < draft-ietf-ipfix-reqs-07.txt>, 28 pages; Sep. 2002; http://www.ietf.org/proceedings/55/I-D/draft-ietf-ipfix-reqs-07.txt.

Calato, P., et al., "Information Model for IP Flow Information Export," draft-ietf-ipfix-info-02, 43 pages; Nov. 21, 2003; http://tools.ietf.org/pdf/draft-ietf-ipfix-info-02.pdf.

Gavalas, D, et al., "A Hybrid Centralised-Distributed Network Management Architecture," pp. 434-441, Jul. 6, 1999; XP010555067; ISBN: 0-7695-0250-4; *Proceedings of the 4th IEEE Symposium on Computers and Communications (ISCC'99)*, Sharm El Sheikh, Red Sea, Egypt.

Yoon, Jeong-Hyuk, et al., "Development of SNMP-XML Translator and Gateway for XML-Based Integrated Network Management," 18 pages; *Int. J. Network Mgmt* 2003; 13: 000-000 (DOI: 10.1002/nem.478); http://dpnm.postech.ac.kr/papers/IJNM/03/xml-translator-ijnm03.pdf.

Imamura, Takeshi, et al., Mapping Between ASN.1 and XML,: 22 pages and one Abstract page; Jan. 8-12, 2001 IEEE Conference, San Diego, CA; Print ISBN: 0/7695-0942-8; http://www.trl.ibm.com/projects/xml/xss4j/docs/RT0362.pdf.

Wikstrom, C., "Processing ASN.1 Specifications in a Declarative Language," pp. 164-173; Software Engineering for Telecommunications Systems and Services, Mar. 30-Apr. 1, 1992 Eighth Internation Conference.

International Search Report for PCT/FR Application No. PCT/FR2004/002271, dated Feb. 28, 2005; 6 pages.

English translation of "PCT Written Opinion of the International Searching Authority" dated Mar. 27, 2006 (5 pages), French International Preliminary Report on Patentability (1 page), and Written Opinion (5 pages) dated Mar. 27, 2006 for PCT/FR2004/002271.

Kobayashi et al., "Managed Objects for IPFIX Concentrator," IPFIX Working Group, Mar. 2, 2006, 35 pgs. http://tools.ietf.org/html/draft-kobayashi-ipfix-concentrator-mib-01.txt.

Norseth et al., "IPFIX Architecture Architecture for IP Flow Information Export," Network Working Group RFC 5470, Feb. 2002, 25 pages http://tools.ietf.org/pdf/draft-ietf-ipfix-architecture-00.pdf.

PCT Notification of Transmittal (1 page) of the International Search Report (4 pages) and the Written Opinion of the International Search Authority (6 pages) mailed Aug. 18, 2010 for PCT/US2010/030607.

Sadasivan et al., "Architecture for IP Flow Information Export," IP Flow Information Export WG (ipfix), Jun. 2004, 34 pgs. http://tools.ietf.org/pdf/draft-ietf-ipfix-architecture-03.pdf.

Zseby et al., "IPFIX Applicability," Network Working Group RFC 5472, Jul. 2004, 15 pages; http://tools.ietf.org/htmldraft-ietf-ipfix-as-02.pdf.

U.S. Appl. No. 12/465,707, filed May 14, 2009, entitled "System and Method for Exporting Structured Data in a Network Environment," Inventor(s): Paul J. Aitken et al.

USPTO Oct. 24, 2011, RCE Response and Interview Summary in response to Jul. 22, 2011 Final Office Action in U.S. Appl. No. 12/465,707.

USPTO Aug. 3, 2012 Notice of Allowance from U.S. Appl. No. 10/573,103.

Claise, B., et al., "Export of Structured Data in IPFIX," IPFIX Working Group, Internet-Draft, http://tools.ietf.org/id/draft-claise-structured-data-in-ipfix-00.txt; 38 pages, 2009.

Kompella, R.R. and Estan, C., "The Power of Slicing in Internet Flow Measurement," USENIX Association, Internet Measurement Conference 2005, http://www.usenix.org/events/imc05/tech/kompella.html; 14 pages, 2005.

Cisco Systems, "NetFlow Services Solutions Guide," http://www.cisco.com/en/US/products/sw/netmgtsw/ps1964/products_implementation_design_guide09186a00800d6a11.html#wp1031447; 71 pages, 2001.

Burbank, J., et al., "Network Time Protocol Version 4 Protocol and Algorithms Specification," draft-ietf-ntp-ntpv4-proto-13; http://tools.ietf.org/html/draft-ietf-ntp-ntpv4-proto-13; 113 pages, 2009.

Franklin, Paul F., "LXI Makes Smart Instruments Possible," Apr. 2007; www.lxiconnexion.com; 4 pages.

PRC May 2, 2013 SIPO First Office Action from Chinese Application Serial No. 201080001236.7.

PRC Sep. 16, 2013 Response to SIPO First Office Action from Chinese Application Serial No. 201080001236.7.

* cited by examiner

| STW WINDOW SIZE | | | |
|---|---|---|---|
| TIME | 5 | 10 | 30 |
| 1242388292 | 58 | 29 | 9 |
| 1242388294 | 58 | 29 | 9 |
| 1242388296 | 59 | 29 | 9 |
| 1242388298 | 59 | 29 | 9 |
| 1242388300 | 60 | 30 | 10 |
| 1242388302 | 60 | 30 | 10 |
| 1242388304 | 60 | 30 | 10 |
| 1242388306 | 61 | 30 | 10 |
| 1242388308 | 61 | 30 | 10 |
| 1242388310 | 62 | 31 | 10 |
| 1242388312 | 62 | 31 | 10 |
| 1242388314 | 62 | 31 | 10 |
| 1242388316 | 63 | 31 | 10 |
| 1242388318 | 63 | 31 | 10 |
| 1242388320 | 64 | 32 | 10 |
| 1242388322 | 64 | 32 | 10 |
| 1242388324 | 64 | 32 | 10 |
| 1242388326 | 65 | 32 | 10 |
| 1242388328 | 65 | 32 | 10 |
| 1242388330 | 66 | 33 | 11 |

FIG. 6

SYSTEM AND METHOD FOR SYNCHRONIZED REPORTING IN A NETWORK ENVIRONMENT

TECHNICAL FIELD

This disclosure relates in general to the field of communications and, more particularly, to synchronized reporting in a network environment.

BACKGROUND

Networking architectures have grown increasingly complex in communications environments. In addition, the augmentation of clients or end users wishing to communicate in a network environment has caused many networking configurations and systems to respond by adding elements to accommodate the increase in networking traffic. The increase in network traffic and in end users has created even more data to be routed, managed, and analyzed. In some cases, data records containing information about traffic can be exported from one point to another. These records can be used for a variety of purposes. As data has grown in complexity and sophistication, there is a significant challenge in optimally synchronizing this exported information.

BRIEF DESCRIPTION OF THE DRAWINGS

To provide a more complete understanding of example embodiments and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving a plurality of packets and generating a data record that is based on information associated with the packets. The data record includes a synchronized time window field that defines a time boundary at which data aggregation associated with the data record is stopped, where the synchronized time window field remains constant as the data aggregation associated with the data record occurs. In other embodiments, the method includes creating a new cache entry for new packets arriving at a network element, where the new cache entry is created in response to a value of the synchronized time window field changing. The synchronized time window field can include a window size attribute that defines how long the synchronized time window remains unchanged. The synchronized time window field can also include a reference time attribute that defines an initial starting point for a clock being used by a network element associated with the data record. In certain examples, if the key fields remain constant, then a counter is incremented in a cache for an associated entry.

Example Embodiments

Figure 1:
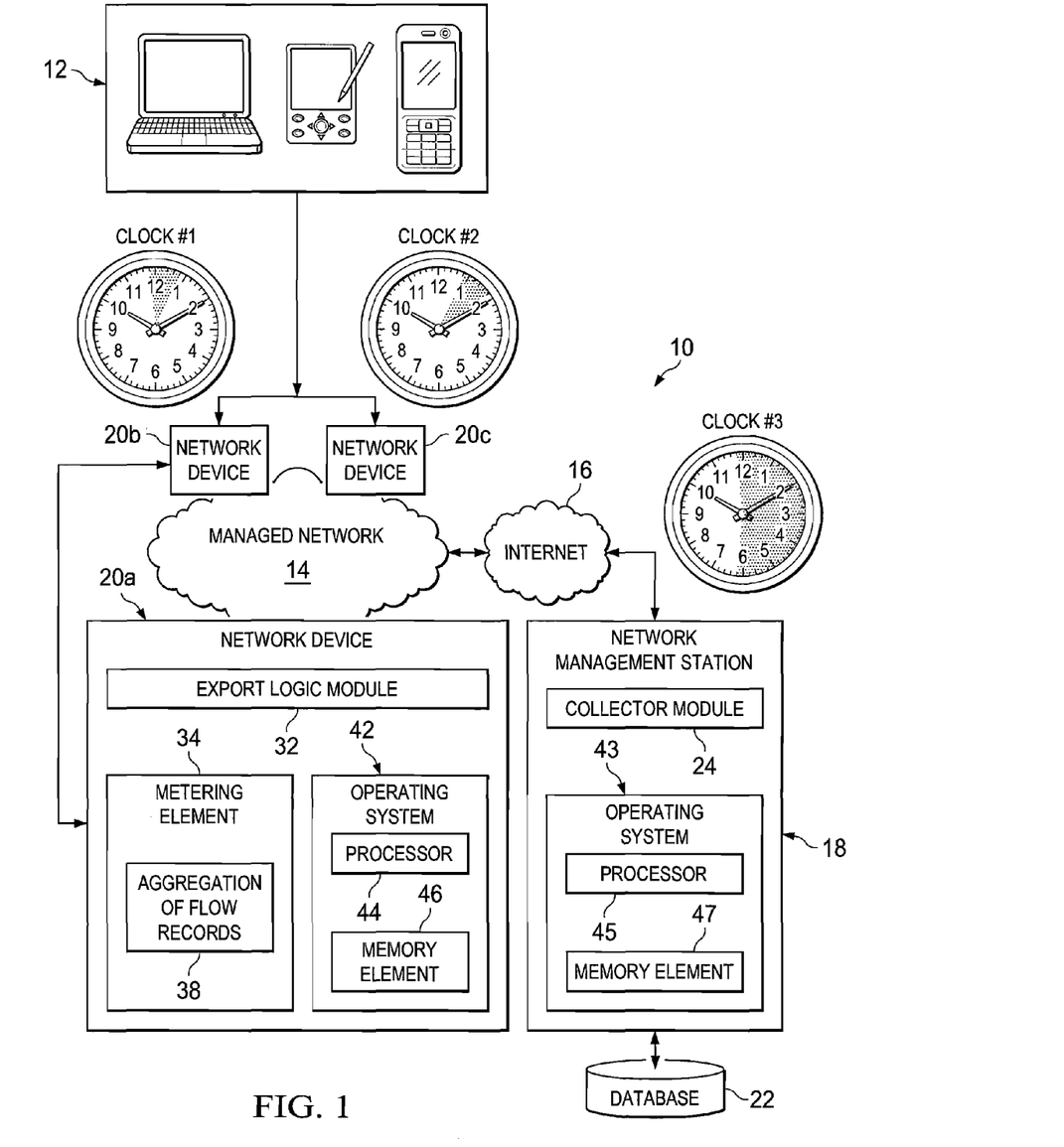
FIG. 1 is a simplified communication system for synchronized reporting in a network environment in accordance with one example embodiment.

Turning to FIG. 1, FIG. 1 is a simplified block diagram of a communication system 10 for synchronized reporting of data in a network in accordance with one example embodiment. Communication system 10 may include an end user 12, a set of network devices 20a-c, a managed network 14, an Internet 16, and a network management station 18, which may include a collector module 24. For purposes of simplification, only network device 20a has been expanded in order to highlight some of its possible internal components, which may be used in achieving, or otherwise fostering, the synchronization activities outlined herein in this Specification. The other network devices can readily include similar components and infrastructure.

Network device 20a may include an export logic module 32 (e.g., an IP flow Information eXport (IPFIX) logic module). Additionally, network device 20a includes a metering element 34, which can include an aggregation of flow records element 38, and an operating system 42, which may include a processor 44 and a memory element 46. In a similar manner, network management station 18 may include an operating system 43, a processor 45, and a memory element 47. Network management station 18 may be coupled to a database 22. Note that network device 20a could be implemented in hardware, clockwork, a bio-mechanism, through photonics, etc. and such implementations could be functional without an operating system or processor.

Each of the elements of FIG. 1 may couple to one another through simple interfaces or through any other suitable connection (wired or wireless), which provides a viable pathway for network communications. Additionally, any one or more of these elements may be combined or removed from the architecture based on particular configuration needs. FIG. 1 includes multiple network devices 20a-c being coupled to managed network 14. Note that the numerical and letter designations assigned to the network devices do not connote any type of hierarchy; the designations are arbitrary and have been used for purposes of teaching only. Communication system 10 may include a configuration capable of transmission control protocol/internet protocol (TCP/IP) communications for the transmission or reception of packets in a network. Communication system 10 may also operate in conjunction with a user datagram protocol/IP (UDP/IP) or any other suitable protocol or tunneling technique, where appropriate and based on particular needs.

Monitoring network performance (e.g. packets seen, dropped, lost, etc.) of the same IP flow (e.g., across multiple devices) presents several challenges. Monitoring infrastructure on the intermediate nodes generally operates on periodic intervals with independent cycle times. As shown by the clocks in FIG. 1, the statistics from network device 20b can be covering a different (possibly overlapping) time period than that of network device 20c.

As an example, consider router interface counters that collect information regarding bytes sent and bytes received (as well as packets sent and received). On many systems, these counters are updated every ten seconds. However, the exact ten seconds can differ from one network device to another network device: regardless of how many times within a ten-second period the device is polled for the data. Given the unaligned observation intervals, it is not possible to determine on a global (e.g., ten-second) basis, how much traffic is seen along a particular path.

In a general sense, flows within current architectures are commonly evaluated over an active timeout period. Each device independently determines whether it is appropriate to export, or not to export, a given set of records. [The individual records can represent a flow of packets over a given time period.] For example, a given set of network devices can independently determine to export records every five minutes. Network device 20*b* could export its records at the end of the five-minute segment, whereas network device 20*c* may choose to export its records at the beginning of the five-minute segment. These network devices are still representing the same flow, even though these time segments are not synchronized.

Additionally, the actual data packets being represented by these two network devices may not be the same. For example, consider a string of ten packets: four of those packets could be represented by the data sent from network device 20*b*, whereas two of those packets could be represented in the export data sent by network device 20*c* (where some degree of overlap occurred). Typically, network management station 18 is tasked with aggregating the two reports being sent by network devices 20*b-c* and, further, including these reports as part of a broader time segment. Network management station 18 can readily generate reports for some superset of the overall time intervals for network devices 20*b-c* (e.g., if the network devices are both reporting every five minutes, it is possible to generate a reasonably accurate hourly report even without synchronized time intervals). This is illustrated by FIG. 1 in which Clock #1 (having a certain five-minute time segment and being associated with network device 20*b*) and Clock #2 (also having a certain five-minute time segment and being associated with network device 20*c*) are being accommodated (i.e., properly aggregated) by Clock #3 (of network management station 18). The thirty-minute time interval of Clock #3 is broad enough to accommodate/cover both five-minute time segments. In one general sense, this would ensure that all of the data values within the reports being sent by network devices 20*b-c* are appropriately represented in the reporting by network management station 18.

Example embodiments of communication system 10 can resolve some of these deficiencies in providing a method for a scalable creation, maintenance, and export of records with synchronized time windows for time-correlated reporting purposes. A key field offers a field whose value differentiates one flow from another. In one particular implementation, communication system 10 can employ a new key field (e.g., a synchronized time window (STW) identifier) being used in the flow record that allows for the creation of synchronized observation time windows. The key field can be the same during the course of the record, while the aggregation event occurs. The key field allows for the correlation of the different records being produced by various network devices. Therefore, using an STW as a key field ensures that data corresponding to different STWs are accrued in different flows.

Note that the beginning and the end of the five-minute segments can represent an arbitrarily small time interval apart because the end of one segment is the beginning of the next. The idea is that the STW length in time would be constant. There is nothing preventing multiple concurrent STWs of differing lengths. Specifically, the time between the end of one time bucket to the beginning of another is meant to be zero. If X is sampling from the beginning of each one-minute boundary to the beginning of the next, while Y is sampling from the end of one minute to the end of the next, then both measure the same thing, although exactly one-minute out of phase. As such, with the first observation from X discarded, the observations from X and Y would be identical.

The approach of communication system 10 offers a higher level of accuracy than existing management techniques. Additionally, such an approach is scalable because it decouples the expiry/export from the forwarding plane. In one example, an additional field in the record itself is used to account for the synchronization. A given time interval may be incremented globally (e.g., at a five-second time interval), where a new record could be created for any ongoing flow since the timer has incremented. This could aid in correlating flow level statistics from different network devices for better diagnosis.

In operation, if the current time period (measured in some unit such as milliseconds) is used as a key field, then every time a timer increments to the next millisecond boundary, packets will no longer be added to existing flows (as at least one key field differs). This can be further refined by allowing the user to specify how many bits of the current time period they wish to be configured to be part of the key. Therefore, if there is a 32-bit millisecond timer and, further, 30 bits are specified to be part of the key, then a new flow would be created (for packets that would otherwise have belonged to the same flow) once the timestamp crosses the designated millisecond boundary. Note that the current time period does not have to be a timestamp; it simply can be an identifier that will change at a determined interval. It could be calculated by using a modulus, an algorithm, or an appropriate division of the current time. Alternatively, it could be stored and modified periodically using a timer. The term 'key field' as used herein in this Specification is meant to include any data segment, identifier, flag, label, token, or element that can differentiate a flow.

Note that the traditional way of addressing unsynchronized observation intervals has been to simply aggregate (e.g., along a time boundary) until the individual observation slices are proportionally small compared to the actual reported view. Continuing with the interface statistics example, rather than try to calculate the end-to-end bytes seen on a ten-second basis, the analysis may aggregate toward a five-minute boundary. In the case of statistical reporting (e.g., NetFlow statistics), this may mean taking one-minute observation reports across the network and aggregating them into 5, 15, and 30-minute aggregations when looking at traffic end-to-end, across multiple devices.

A more severe complication in this paradigm is due to the actual expiry intervals. For example, in a normal cache, a flow's data is collected and observed until the flow is expired. A special kind of cache (e.g., called the 'immediate cache') can be used, and that essentially has an observation interval of zero. With the immediate cache, there is no observation interval to synchronize. However, the immediate cache has considerable scalability and performance limitations. For example, each received packet would either need an equivalent transmitted report packet (i.e., toward network management system 18), or a given network device would need to create a per-packet timestamp, in addition to a data state, within its memory.

The cache expirations are based on a number of factors that can affect the observation interval. These factors may include the length of time a flow has been active; the length of time a flow has been inactive; a TCP state of the flow; a percentage of the cache in use (e.g., higher than 90% can trigger random emergency early expires), etc. Given the above expiry causes, the effective observation interval itself can be unpredictable, before even considering the fundamental synchronization problems. Also, in some instances, even though a flow entry might be a candidate for expiry (e.g., where the flow has been seen for longer than one minute, and the active timeout is one minute), it might be a few seconds until the flow entry is actually removed from the cache and then exported. During all this time, the observation will continue until the actual entry removal occurs. [Note that if the STW value has changed or the TCP state were used as the key, then the particular flow would be dead and the data would be accruing against other flows.] In this way, while the expiry times affect the observation interval, they are not the same. Possible solutions and approaches to certain caching problems (which are typical of data reporting architectures) are detailed below with respect to associated FIGURES. Before turning to those additional operations of communication system 10, a brief discussion is provided about the infrastructure of FIG. 1.

End user 12 can be associated with clients, subscribers, or customers associated with any type of communication in communication system 10 via some network. For example, the end user may be remote, querying a server and a local network that is being monitored. The term 'end user' is inclusive of devices used to initiate a communication, such as a computer, a personal digital assistant (PDA), a laptop or electronic notebook, a cellular telephone, an i-Phone, an IP phone, or any other device, component, element, or object capable of initiating voice, audio, video, media, or data exchanges within communication system 10. End user 12 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, or script data, or any type of source or object code, or any other suitable information in any appropriate format that may be communicated from one point to another.

Network device 20a can be any type of network element that receives or that observes (e.g., sniffing activities, etc.) packets. It is consistently establishing flows and generating records associated with the data passing through it. Network device 20a can collect information related to these packets (e.g., via aggregation of flow records element 38). Note that the aggregation can be spatial aggregation (i.e. the aggregation of data records observed from multiple observation points), or time composition (i.e. the aggregation of data records observed from different points in time). The received information can be aggregated and sent to network management station 18, which can receive it and appropriately process this information (e.g., for diagnosis purposes). In one example implementation, this involves export logic module 32, which can assist in these exporting operations.

In one example implementation, each of the network devices of FIG. 1 implements a NetFlow protocol for collecting IP traffic information. For example, the NetFlow protocol can be used when exporting information about the collected traffic (i.e., per export logic module 32). Each network device can generate particular records, which can be exported from the network device (e.g., in user datagram protocol (UDP), stream control transmission protocol (SCTP), etc.). Note that as used herein in this Specification, the term 'export' is meant to encompass any type of transmitting activity from one node to another in the context of the data communications outlined herein. In one example, records can be collected using collector module 24. In addition, the network devices of FIG. 1 could implement an IPFIX protocol (as defined in RFC 5101). IPFIX offers a protocol based on NetFlow (as defined in RFC 3954). An IPFIX (or NetFlow) exporting process can export data records.

In one particular example, software provided in a given network device (e.g., as depicted in FIG. 1 for network device 20a) can accommodate the synchronized reporting, as detailed herein in this Specification. By providing an appropriate mechanism for these individual network devices, aggregation is simplified for network management station 18. Network management station 18 can readily generate reports from particular time periods, allowing a set of time periods to be systematically evaluated.

Reciprocally, network management station 18 may include intelligence that understands the new STW field being exported by the network devices. In addition, network management station 18 can use the data within the STW field to correlate different reports from across all the network nodes. In one example, the STW field is simply a token, a label, an identifier, etc. that can be recognized and/or understood by various devices in the network. In operation of one example involving the components of FIG. 1, network devices 20b-c can use a five-minute STW to adhere to an expiration covering 10:00-10:05. Thus, the exported flows would cover the same time period. These devices know it is the same time period expiration because of the STW mechanism. In addition, network management station 18 understands that these incoming reports actually cover this specific time interval from 10:00-10:05. Hence, the 30-minute interval illustrated in FIG. 1 would not be necessary. Network devices 20b-c are time synchronized (e.g., using a network time protocol (NTP)) such that they are operating on the same clock. This can be used to derive the same STW, where reporting by the network devices to network management system 18 can include an appropriate identifier or label (e.g., STW #1, STW #2, etc.) that is indicative of the particular time interval.

The STW key field can change at every synchronization cycle. In one example, this cycle is not only absolute within the device, but also across the network. Time synchronization methods such as NTP or IEEE 1588 may be used. Based on the monitoring interval, the accuracy of clock synchronization may be flexible. For example, if the monitoring interval is one minute, then 100-200 ms of error (readily accommodated within NTPv4) may be acceptable.

In operation, where a given network element is responsible for generating records, sampling allows for the collection of statistics for a subset of incoming (ingress) traffic. These sampling activities can significantly reduce central processing unit (CPU) utilization on a given network element (e.g., a router) and, further, reduce export volume. Sampling can be useful for capacity planning, or for network planning when not every flow is needed to understand the network behavior. Sampling types can include: deterministic sampling, time-based sampling, and random sampling. Deterministic sampling can select every Nth packet. Random sampling can randomly select one out of N packets with N specified by the user. Time-based sampling can select a sampled packet every N milliseconds. In each case, N can be specified by an administrator.

In one example implementation, network device 20a and network management station 18 include elements (e.g., software) that facilitate the operations outlined herein. Network device 20a can include the ability to construct and/or adhere to STW mechanisms and export their information, where data could be received and processed by network management station 18. In this sense, these two devices offer complementary operations in which data being transmitted by network device 20a can be understood and processed effectively by network management station 18 (e.g., through collector module 24).

In one example implementation, network device 20a and network management station 18 are network elements that facilitate or otherwise help coordinate synchronization (e.g., for the network illustrated in FIG. 1). As used herein in this Specification, the term 'network element' is meant to encompass network appliances, servers, routers, switches, gateways, bridges, loadbalancers, firewalls, processors, modules, or any other suitable device, component, element, or object operable to transmit and/or receive information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one example implementation, network device 20a and network management station 18 include software (e.g., as part of export logic module 32, metering element 34, and/or collector module 24) to achieve the synchronization operations, as outlined herein in this document. In other embodiments, this feature may be provided external to these elements, or included in some other network device to achieve this intended functionality. Alternatively, both elements include software (or reciprocating software) that can coordinate in order to achieve the operations, as outlined herein. In still other embodiments, one or both of these devices may include any suitable algorithms, hardware, software, components, modules, interfaces, or objects that facilitate the operations thereof.

Internet 16 represents a series of points or nodes of interconnected communication paths for receiving and transmitting packets of information that propagate through communication system 10. Internet 16 offers a communicative interface between managed network 14 and network management station 18, and may be any local area network (LAN), Intranet, extranet, wireless local area network (WLAN), metropolitan area network (MAN), wide area network (WAN), virtual private network (VPN), or any other appropriate architecture or system that facilitates communications in a network environment. Internet 16 may implement a UDP/IP connection and use a TCP/IP communication protocol in particular embodiments of the present disclosure. However, Internet 16 may alternatively implement any other suitable communication protocol for transmitting and receiving data packets within communication system 10. Internet 16 may foster any communications involving services, content, video, media voice, or data more generally, as it is exchanged between various network elements.

In regards to the internal structure associated with communication system 10, each of network device 20a and network management station 18 can include memory elements for storing information to be used in achieving the synchronization operations, as outlined herein. Additionally, each of these devices may include a processor that can execute software or an algorithm to perform the synchronization activities as discussed in this Specification. These devices may further keep information in any suitable memory element [random access memory (RAM), read only memory (ROM), an erasable programmable read only memory (EPROM), an electrically erasable programmable ROM (EEPROM), ASIC, etc.]. Any of the memory items discussed herein should be construed as being encompassed within the broad term 'memory element.' The information being tracked or sent by network device 20a and/or network management station 18 could be provided in any database, register, control list, or storage structure: all of which can be referenced at any suitable timeframe. Any such storage options may be included within the broad term 'memory element' as used herein in this Specification. Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that in certain example implementations, the synchronization functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements [as shown in FIG. 1] can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an EPROM, an EEPROM) or an ASIC that includes digital logic, software, code, electronic instructions, or any suitable combination thereof.

Figure 2:
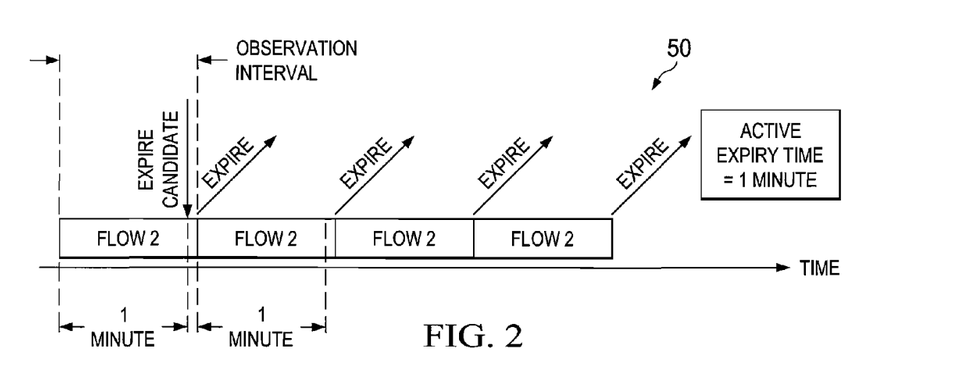
FIGS. 2-4 are simplified example flow diagrams illustrating various synchronizing activities associated with the communication system.

Turning to FIG. 2, FIG. 2 is a simplified flow diagram 50 illustrating example observation intervals. Note that the active expiry time is set equal to one minute in this particular example. Each of the reports shown in FIG. 2 is based in the context of a single flow. For example, in the case of ten flows that were learned one second apart, their expiry candidacy (if expired under the active timer) would also be one second apart, leading to a condition where the same synchronization problem that exists in the end-to-end multi-node case also exists within a single node across multiple flows.

Note that the discrepancy in the start and end of the one-minute boundary is intentional. For an active-timer case, even though an entry might be a candidate for expiry, there may be some non-zero time until it is expired from the cache. During this time, any packets that might arrive can be accounted against this cache entry (assuming the key field values remain the same). Once the STW field value changes, the flow would be dead until it is exported. As shown in FIG. 2, this non-zero time is represented as the delta between the one-minute mark and the 'observation interval.'

Figure 3:
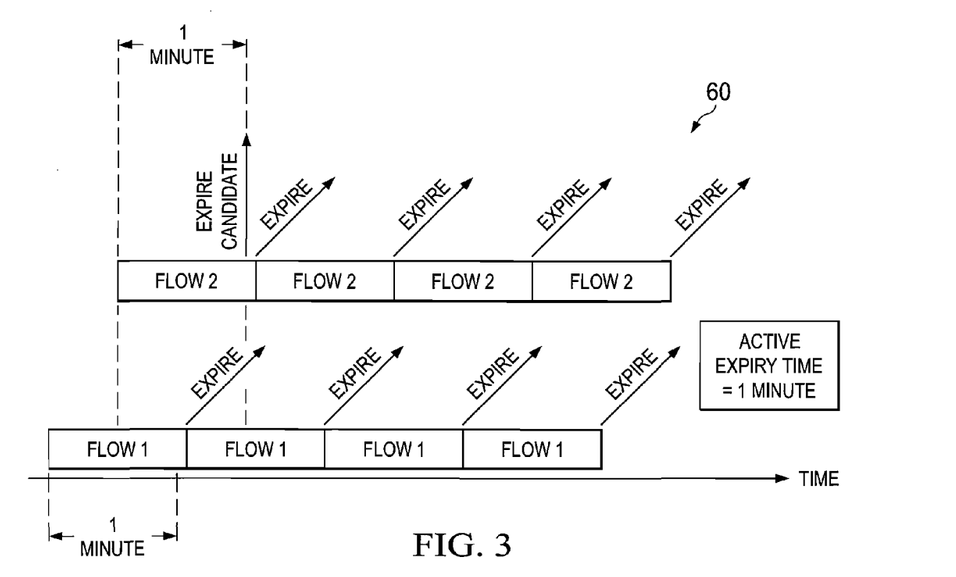

FIG. 3 is a simplified flow diagram 60 illustrating another example set of time intervals, where the active expiry time is set to equal one minute. This particular illustration shows unsynchronized monitoring across different flows (e.g., for the same node). Note that there a time discrepancy depicted in FIG. 3, and this discrepancy is also intentional. The discrepancy is meant to show the differing expiry candidate times for different flows. When the STW is used, the extra time from the end of the minute until the time when the flow is expired would be irrelevant, as no traffic would be accounted in the flow after the STW changes. In a generic sense, FIG. 3 is depicting the imperfect existing condition, where use of the STW would change this depiction to illustrate an additional accuracy improvement such that the boundaries would become aligned.

FIG. 3 illustrates a lack of synchronization between flow exports. A problem can develop where analyzing the most granular reports (one-minute interval in this case) would mean not being able to fully account for significant chunks of time for many flows. To solve this deficiency, there is aggregation (on a time boundary) until the unaccounted chunks of time are insignificant. This technique of aggregation on a time boundary has been sufficient for traffic profiling cases such as capacity planning. However, in the case of performance monitoring and troubleshooting, small time windows are significant. Being able to stop discrepancies is a fundamental aspect of troubleshooting, and the aggregation process moves this in a counter direction: making the troubleshooting job even more difficult.

Communication system 10 can employ the STW key field in the flow record and this allows for the creation of synchronized observation time windows. The STW key field stays constant, while the aggregation event is happening. The STW key field allows for the correlation of different records being produced by network devices. Note that in typical reporting protocols (e.g., in NetFlow), a key field determines the definition of a 'flow.' For example, in a typical cache, the IP source address, IP destination address, IP protocol, layer-four source port, layer-four destination port, and other fields can be the key fields. Provided that this tuple remains the same in each packet, counter fields (such as byte count, etc.) are incremented against a single cache entry for that 5-tuple. However, if (for example), a packet is seen with a different IP source address, a new cache entry can be created, populated with the key fields for the 5-tuple from this packet, and then the new counter fields are initiated.

In operation, the key fields (including the STW field) in communication system 10 are constant as data packets arrive, where filtering can occur against these fields. The non-key fields are systematically updated (e.g., a counter value for the number of bytes associated with the particular flow). Thus, while the STW stays the same, all the collection that happens for the sets of flows is locked per the STW. The STW effectively locks in those measurements for that given time period.

Because the STW is locked as a function of time, when the STW is changed, the system moves to a new unit of time. Once the STW is changed, the previous STW is no longer maintained. This allows the configuration to dictate the expirations of the STW. In essence, newly arriving data will not be counted against the previously expired STW (e.g., a previous cache entry). This provides the advantage of not having to walk the entire cache forcibly through time expirations at specific intervals, at specific grades, etc. These cache activities result in data being exported over to collector module 24. The mechanisms of communication system 10 provide that the change in the STW triggers a new cache entry, where summations and collections are subsequently initiated.

Figure 4:
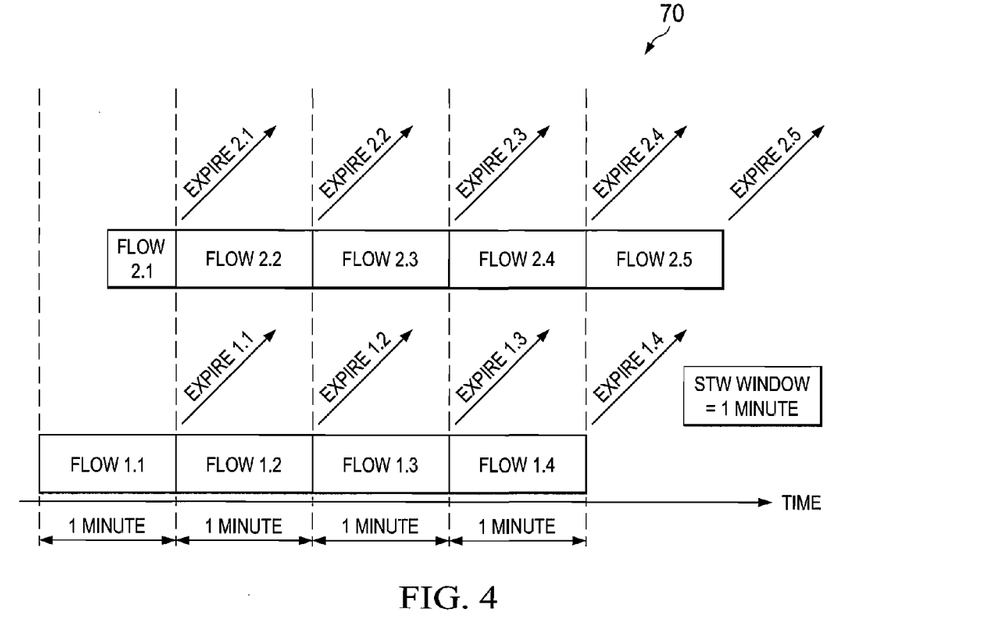

FIG. 4 is a simplified flow diagram 70 illustrating synchronized monitoring using the STW key field. FIG. 4 is representing some of these activities, for different time intervals for Flows 1.1, 1.2, 1.3, and 1.4 and, subsequently, for Flows 2.1, 2.2, 2.3, 2.4, and 2.5. In a general sense, the STW is changing independent of the behavior of the flow itself. The STW is internally driven, which allows it to consistently move from one cache entry to another cache entry. In addition, it should be noted that the expirations depicted in FIG. 4 can be grouped together. In addition, the metering process and the reporting process have been disassociated, while maintaining the time intervals in the reporting process.

Note that, in certain example operations, a cache may become full (or nearly full) if older cache entries cannot be removed fast enough, while new sets of flows continue propagating into the network device. For example, as the first one-minute interval ends (as shown in FIG. 4), and where the expiration of Flow 1.1 occurs, there is a strain on the cache (e.g., a cache within metering element 34). This is because the memory is forced to hold Flow 1.1 and Flow 1.2. The STW mechanism provides that a given network element should maintain all flows within the network element. In one general sense, twice as many flows need to be accounted for by the metering cache. In approximate terms, the STW can force all network elements to rollover at the same time, which roughly doubles the requirements for the cache. In certain example embodiments, this can be cured by employing a sub-STW, which can be much smaller, but which is not necessarily represented in the actual reporting. This minimizes the exposure for the cache and, thereby, alleviates some of that strain. For example, for a 60-second STW, a 15-second sub-STW could be used to lessen the burden on the cache. Cache requirements could be dropped in such an instance, where reporting may be slightly increased.

Figure 5:
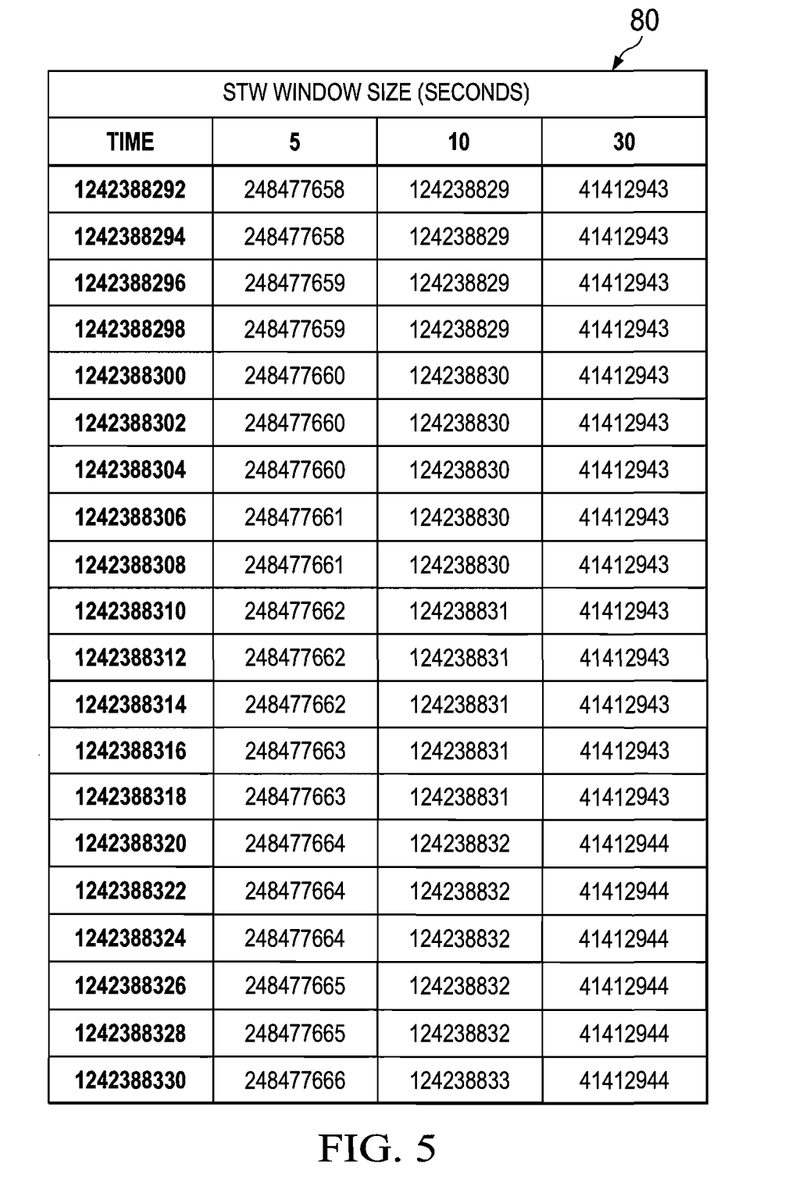
FIGS. 5-6 are simplified table diagrams illustrating an example set of window sizes associated with the communication system.
Figure 6:
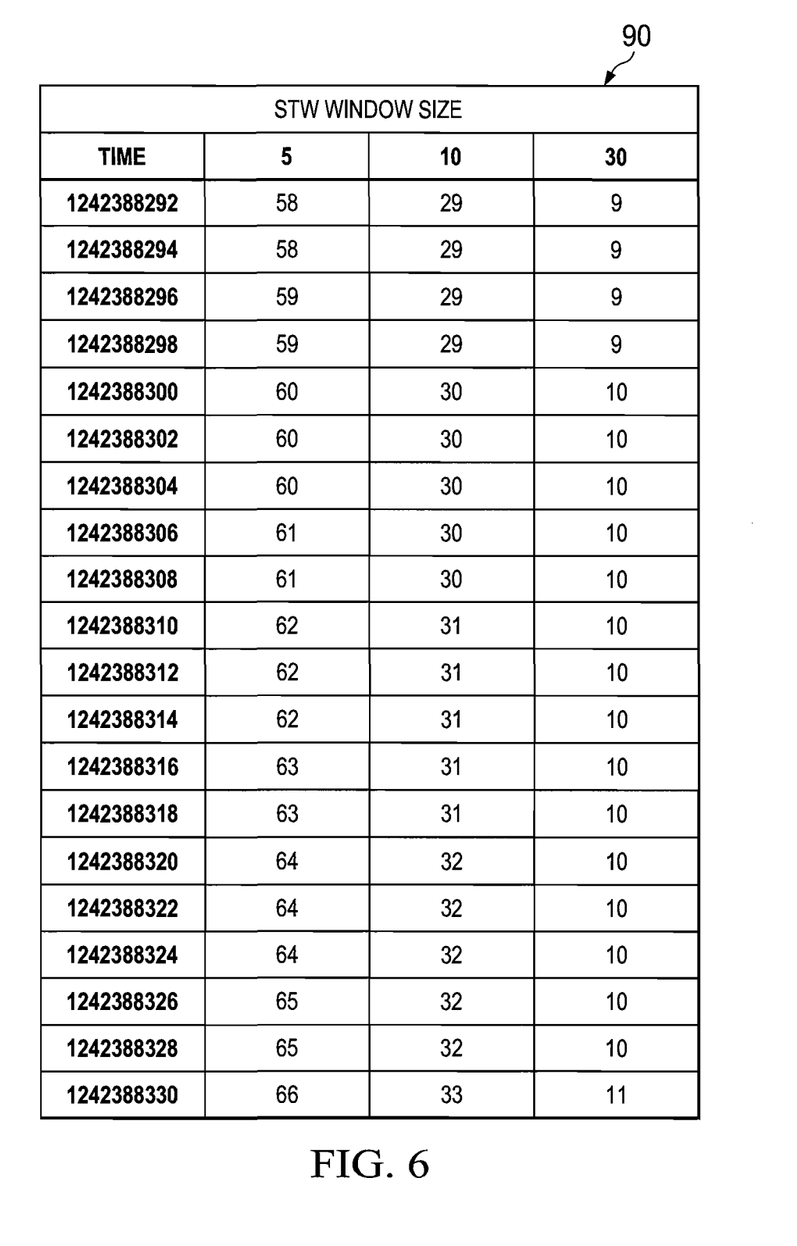

FIGS. 5-6 are simplified table diagrams 80 and 90 respectively for offering example window size configurations. In regards to the mechanics of the synchronized time window, as the STW field itself refers to a window in time, it can be used as a time correlation field across flows, and across the network, to identify the flows, their rate etc., at a granular level. There can be a global, cross network value for the synchronized time window at any point in time, as derived from the (synchronized) system clock. This means that, on a per-node basis, this same value can be populated in the key-field across all flows arriving at a network device during this window. When the value of the STW changes, new cache entries can be created for packets as they arrive: even if nothing in the arriving packets (5-tuple wise) has actually changed. This is because one of the key fields, namely the STW, has changed.

There can be two main properties of the STW that should be available (so the STW can be initiated): window size and reference time. The window size attribute defines how long the STW remains unchanged (e.g., one minute, one hour, etc.). This value determines the observation interval. At the end of a specific observation interval, as the STW value has changed, no more packets are metered against the old STW flow and that flow entry will eventually be expired. The aggregation operation has effectively stopped. The reference time attribute defines the zero point for the clock that is being used. There are several possible implementations, which can include: 1) using the time standards existing reference (e.g., UNIX time is counting seconds since Jan. 1, 1970); and 2) providing a user-created reference time. The benefit in the first approach is that the user does not need to provide a reference time for calculating a synchronized STW value across the network. The reference time is implicitly provided. However, depending on the scope (how many centuries, etc.) and the granularity (e.g., milliseconds, nanoseconds, etc.) of the time field, not providing a reference time can result in a high overhead (e.g., in terms of byte volume) in the reports, as well as storage requirements on both network device 20a and collector module 24.

It should be noted that, if the intent is only to synchronize flows to time windows on a single device, there would be no need to synchronize time between multiple devices. However, the more significant aspects of the STW can be if the time windows are able to be referenced across multiple devices. In the simplest case, synchronized time is available across the multiple nodes in the network that can be using STW. The reference time can be agreed upon and provided to the individual devices, if the implicit method is not used. In a simple implementation, the STW value may be derived with a bit mask. A more practical implementation can use the wall-clock time value and derive the quotient using the time and the STW window size, such as that provided by: STW value=QUOTIENT (time, STW size). Various algorithms can use these items (or other items, or derivations of these items) in order to properly determine STW values.

FIG. 5 shows an example STW value, given a configured five-second, ten-second, and thirty-second STW size. The time field is represented in standard UNIX time, but the NTP 128-bit value could also be used (e.g., potentially at the cost of additional storage space and transmission bandwidth). The table of FIG. 6 illustrates a STW value for a configured five-second, ten-second, and thirty-second STW size if a user-specified reference time is provided. The time field in the table is represented in standard UNIX time, but could be in a different format. It should be noted that with this case (i.e., a user-specified reference time), the storage and bandwidth costs are considerably reduced.

Note that in an alternative embodiment, and in the context of avoiding the flows being synchronized on the exact same time boundary on a given network device, communication system 10 can stage N different STWs and, further, spread flows over each of these STWs. The association of flows to STWs can be deterministic and, further, can be performed consistently across all network devices such that the network devices all remain synchronized for a given flow. This could be achieved by hashing on basic flow properties (e.g., IP addresses, or on any other suitable attribute, value, parameter, etc.) and, subsequently, including those properties as key fields.

Note that the STW field does not have to be included in each data record for the architecture presented herein to be functional. For example, if each network device 20a-c were to be configured with an STW of five minutes and, further, network management station 18 were to be configured to aggregate records according to five-minute boundaries, then the STW would not have to be part of the exported data record. Instead, the normal start and end timestamps could be used and network management station 18 could readily find that none of the data records had times that spanned any five-minute boundary. Also, an STW field would not have to be part of any flow within the network device's monitoring application. Alternatively, a single timer (e.g., a shared STW) could be used to synchronize all flows within a given device.

It is also important to note that the steps described with reference to the preceding FIGURES illustrate only some of the possible scenarios that may be executed by, or within, communication system 10. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the discussed concepts. Along a similar rationale, the preceding flows and FIGURES have annunciated specific rules or commands for addressing certain traffic or processing scenarios, but these are simply offering possible (not required) guidelines for achieving the operational capabilities tendered herein. There is considerable flexibility in how these activities can be conducted and any such pronouncements (as earnestly offered in this Specification) should not be construed to limit the broad scope or the framework presented in FIGS. 1-6.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, and exporting protocols, communication system 10 may be applicable to other exchanges, routing protocols, or reporting protocols in which packets (not necessarily the reporting protocol/packets described) are exchanged in order to provide synchronization data, time window management, etc. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
receiving a plurality of packets;
generating a data record that is based on information associated with the packets, wherein the data record includes a key field comprising a synchronized time window field that defines a time boundary at which data aggregation associated with the data record is stopped, and wherein data aggregation associated with the data record continues so long as a value of the synchronized time window field remains constant;
identifying that the value of the synchronized time window field has changed from a previous value to a new value;
expiring a previous cache entry associated with the previous value of the synchronized time window field; and
creating a new entry in a cache, wherein the new entry includes the new value of the synchronized time window field to be used as subsequent packets arrive at a network element.

2. The method of claim 1, further comprising:
creating a new cache entry for new packets arriving at a network element, wherein the new cache entry is created in response to the value of the synchronized time window field changing.

3. The method of claim 1, wherein the synchronized time window field includes a window size attribute that defines how long the value of the synchronized time window remains unchanged.

4. The method of claim 1, wherein the synchronized time window field includes a reference time attribute that defines an initial starting point for a clock being used by a network element associated with the data record.

5. The method of claim 1, wherein the synchronized time window field is a key field that is evaluated to determine whether its value has changed.

6. The method of claim 1, wherein the data record is received and evaluated to create reports, statistical analysis, or diagnostic evaluations associated with the data record.

7. Logic encoded in one or more non-transitory tangible media that includes code for execution and when executed by a processor operable to perform operations comprising:
receiving a plurality of packets;
generating a data record that is based on information associated with the packets, wherein the data record includes a key field comprising a synchronized time window field that defines a time boundary at which data aggregation associated with the data record is stopped, and wherein data aggregation associated with the data record continues so long as a value of the synchronized time window field remains constant;

identifying that the value of the synchronized time window field has changed from a previous value to a new value;

expiring a previous cache entry associated with the previous value of the synchronized time window field; and creating a new entry in a cache, wherein the new entry includes the new value of the synchronized time window field to be used as subsequent packets arrive at a network element.

8. The logic of claim 7, the processor being further operable to perform operations comprising:

creating a new cache entry for new packets arriving at a network element, wherein the new cache entry is created in response to the value of the synchronized time window field changing.

9. The logic of claim 7, wherein the synchronized time window field includes a window size attribute that defines how long the value of the synchronized time window remains unchanged.

10. The logic of claim 7, wherein the synchronized time window field includes a reference time attribute that defines an initial starting point for a clock being used by a network element associated with the data record.

11. The logic of claim 7, wherein the synchronized time window field is a key field that is evaluated to determine whether its value has changed.

12. An apparatus, comprising:

a memory element configured to store data, a processor operable to execute instructions associated with the data, and an export module and a metering element configured to coordinate their operations in order to:

generate a data record that is based on information associated with the packets, wherein the data record includes a key field comprising a synchronized time window field that defines a time boundary at which data aggregation associated with the data record is stopped, and wherein data aggregation associated with the data record continues so long as a value of the synchronized time window field remains constant;

identify that the value of the synchronized time window field has changed from a previous value to a new value;

expire a previous cache entry associated with the previous value of the synchronized time window field; and create a new entry in a cache, wherein the new entry includes the new value of the synchronized time window field to be used as subsequent packets arrive at a network element.

13. The apparatus of claim 12, wherein a new cache entry is created for new packets arriving at a network element, and wherein the new cache entry is created in response to the value of the synchronized time window field changing.

14. The apparatus of claim 12, wherein the synchronized time window field includes a window size attribute that defines how long the value of the synchronized time window remains unchanged, and wherein the synchronized time window field includes a reference time attribute that defines an initial starting point for a clock being used by a network element associated with the data record.

15. The apparatus of claim 12, wherein the synchronized time window field is a key field the value of which is evaluated to determine whether it has changed.

16. The apparatus of claim 12, wherein if key fields remain constant, then a counter is incremented in a cache for an associated entry.

17. The apparatus of claim 12, further comprising:

a network management station configured to receive and evaluate the data record to create reports, statistical analysis, or diagnostic evaluations associated with the data record.

* * * * *